US006761026B2

(12) United States Patent
Hogan

(10) Patent No.: US 6,761,026 B2
(45) Date of Patent: *Jul. 13, 2004

(54) WATER PRESSURE DRIVEN GENERATOR

(76) Inventor: Michael G. Hogan, 5734 Lakefront Dr., Shreveport, LA (US) 71119

( * ) Notice: Subject to any disclaimer, the term of this patent is extended or adjusted under 35 U.S.C. 154(b) by 0 days.

This patent is subject to a terminal disclaimer.

(21) Appl. No.: 10/261,874

(22) Filed: Oct. 1, 2002

(65) Prior Publication Data

US 2003/0026688 A1 Feb. 6, 2003

Related U.S. Application Data

(63) Continuation-in-part of application No. 09/721,358, filed on Nov. 20, 2000, now Pat. No. 6,474,061.

(51) Int. Cl.$^7$ ............................................. F16D 33/00
(52) U.S. Cl. ....................................................... 60/325
(58) Field of Search .......................... 60/398, 325, 413, 60/455, 485; 415/182.1, 202; 418/61.2, 58, 61.1, 236, 113, 125, 143

(56) References Cited

U.S. PATENT DOCUMENTS

| 964,837 A | 7/1910 | Austin ......................... 415/220 |
| 1,160,032 A | 11/1915 | Allan .......................... 60/485 |
| 1,414,984 A | 5/1922 | Hood .......................... 415/202 |
| 2,097,166 A | 10/1937 | Stone ........................... 60/398 |
| 3,676,015 A | 7/1972 | Hodgman, Jr. .............. 415/202 |
| 3,762,842 A | 10/1973 | George, Jr. ................. 418/61.2 |
| 3,825,375 A | 7/1974 | Deane ........................ 418/61.2 |
| 3,847,514 A | 11/1974 | Chen et al. ................. 418/61.2 |
| 4,047,856 A | 9/1977 | Hoffman .................... 418/61.2 |
| 4,137,024 A | 1/1979 | Jones ......................... 418/61.2 |
| 4,142,367 A | 3/1979 | Guisti .......................... 60/325 |
| 4,607,169 A | 8/1986 | Donnelly, Jr. ................ 290/54 |
| 5,144,802 A | 9/1992 | Ruzic ........................... 418/15 |
| 5,310,325 A | 5/1994 | Gulyash .................... 418/61.2 |
| 6,070,409 A | 6/2000 | Kaiser ......................... 60/512 |
| 6,168,405 B1 | 1/2001 | Nosenchuck ............... 418/61.2 |

OTHER PUBLICATIONS

The information attached in related application Ser. No. 09/721,358 is a representative of applicant's knowledge of the prior art material to this application.

Primary Examiner—Edward K. Look
Assistant Examiner—Michael Leslie
(74) Attorney, Agent, or Firm—Jones, Walker, Waechter, Poitevent, Carrere & Denegre, L.L.P.

(57) ABSTRACT

A fluid pressure driven generator which includes a generator housing and a rotor positioned within the generator housing. The rotor will have an internal offset gear which is engaged by a spur gear on a power shaft. A high fluid pressure inlet will be formed in the housing and connected to a source of high pressure fluid. The housing will also have low pressure outlet which will feed a source of low pressure fluid.

25 Claims, 8 Drawing Sheets

Section A-A

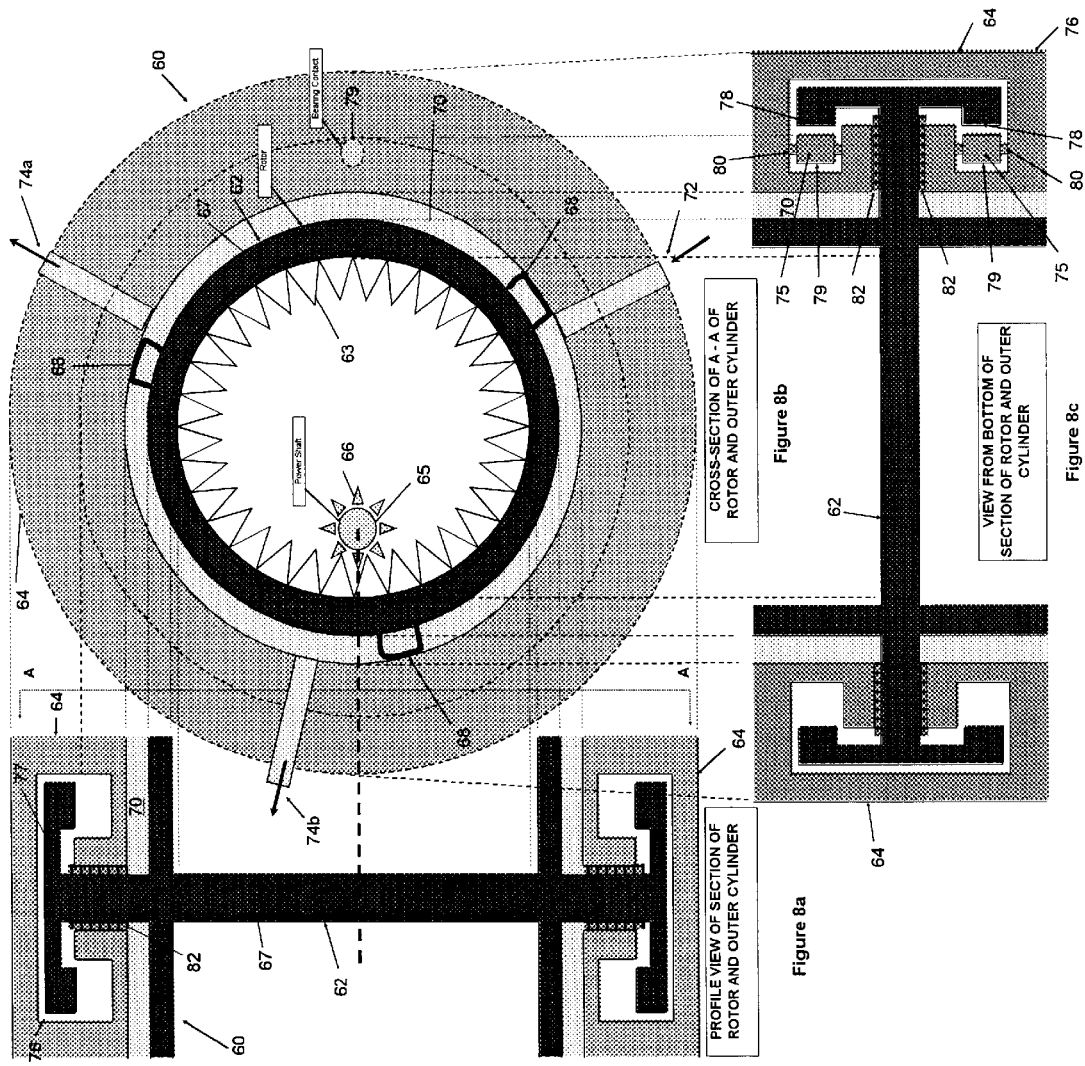

WATER PRESSURE DRIVEN GENERATOR

This application claims priority to U.S. application Ser. No. 09/721,358 filed on Nov. 22, 2000 now U.S. Pat. No. 6,474,061, which is incorporated by reference herein in its entirety.

1. BACKGROUND OF INVENTION

The present invention relates to generators or motors driven by water or other fluids and more particularly to a generator or motor which may be driven by water pressures typically found in municipal water lines. The invention also relates to a generator or motor for use in a hybrid mobile vehicle wherein the generator/motor can be driven by water (or other fluids) pressurized by any conventional method. Moreover, the present invention could be employed in any number of other uses, such as in power generation systems where the invention proves to be a more efficient generator/motor than another element in the power generation value-chain.

Municipal water systems typically pressurize water in system's lines to around 70 psi to 90+ psi. While a water pressure of approximately 20 psi to 40 psi is largely adequate for most end-user's purposes, the higher pressure is maintained for peak water demands or emergency (e.g. fire) water demands. This means that 70 psi to 30 psi of unneeded excess water pressure normally exists in most water lines. To the inventor's knowledge, there has been no attempt in the prior art to recover useful power from this excess water pressure. It would be a significant advance in the art to provide an apparatus and method which are capable of recovering useful power from pressurized water lines.

2. SUMMARY OF THE INVENTION

The present invention provides a fluid pressure driven generator/motor having a generator/motor housing, a rotor positioned within the housing and having an internal offset gear, a power shaft having a spur gear engaging the internal offset gear; and a high pressure inlet and a low pressure outlet formed in the housing. A source of substantially incompressible fluid will communicate with the high pressure inlet.

One embodiment of the present invention will operate in principle by recovering power stored in the higher pressure water (or another fluid) and then returning lower pressure water (albeit at sufficient pressure for most commercial or domestic uses) to a low pressure water supply. Therefore, the present invention provides a water pressure driven generator/motor. The generator/motor will include a generator/motor housing and a rotor positioned within the generator/motor housing. The rotor will have an internal offset gear which is engaged by a spur gear on a power shaft. A high-pressure water inlet will be formed in the housing and connected to a source of high-pressure water. The housing will also have a low-pressure outlet.

In addition, the invention is readily adaptable for generating significant torque drive in hybrid mobile vehicles where the hybrid vehicle utilizes an alternative power source for water (or another fluid) pressure and for water recirculation. In such a hybrid mobile vehicle, water pressures ranging from 100, to 500, to 5000 psi or more can be employed. Also, the invention is readily adaptable for use in generating power at any decentralized site where pressurized water (or another fluid) is made available.

3. BRIEF DESCRIPTION OF THE DRAWINGS

FIGS. 8a, 8b, and 8c illustrate an alternative embodiment of the fluid pressure driven generator/motor of the present invention.

4. DETAILED DESCRIPTION OF THE INVENTION

The following description of the fluid driven generator of the present invention discusses certain embodiments where the driving fluid is water. However, the present invention is intended to be operable with many other types of relatively incompressible fluids and the term "water" should be considered interchangeable with those other fluid types. One example of an alternative fluid would be oil. Those skilled in the art will recognize that very low viscosity fluids (e.g. water) offer certain mechanical advantages as the driving fluid, but also have disadvantages when trying to as minimize leakage through and around mechanical seals. All variations of incompressible fluids which could be effectively used in the described generator are intended to come within the scope of the present invention.

Figure 1:
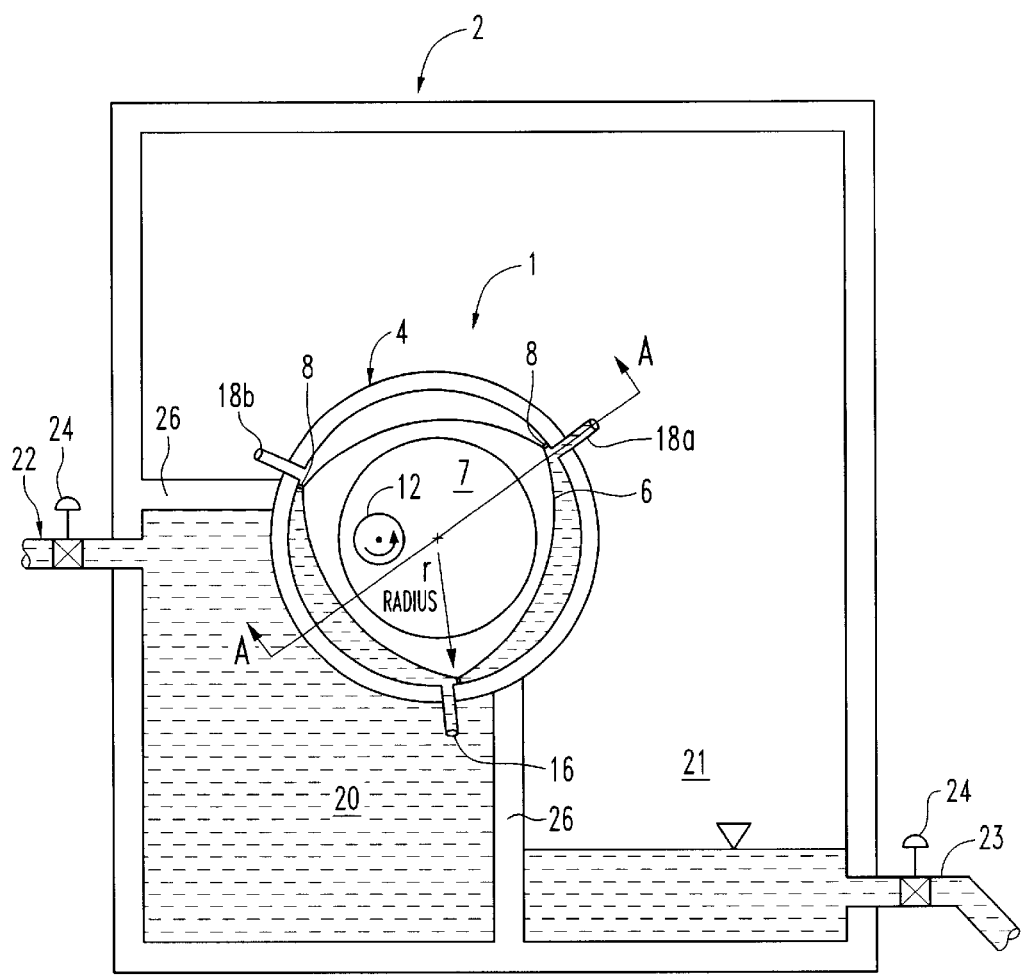
FIG. 1 is a cross-sectional view of one potential configuration of the fluid pressure driven generator of the present invention.

FIG. 1 illustrates the fluid pressure driven generator 1 enclosed in a pressure chamber 2. Pressure chamber 2 will include a high pressure section 20 which is separated from low pressure section 21 by walls 26. A high-pressure water source 22 will be connected to high pressure section 20 by way of a valve 24. The low pressure section 21 will serve as a supply of low-pressure water which is connected to low pressure supply line 23 by way of another valve 24. As used in reference to the figures, a "high pressure water source" is generally considered the pressure level most commonly found in conventional municipal water supply systems. Commonly this pressure ranges from 70 pounds per square inch (psi) to 90 or greater psi, but could include greater pressure ranges such as 50 psi to 150 psi (or even greater fluid pressures). While pressures of higher than 150 psi are not typically found in residential and commercial water supply systems, there may be specialized uses of the present invention which would utilize pressures over 150 psi (such as in hybrid mobile vehicles and other applications). The "low pressure water supply" will generally be water at a pressure considered sufficient for most residential or commercial uses, such as 20 psi to 30 psi. However, the use of the present invention is not limited to any particular pressure range, but only requires a sufficient pressure differential across the system to allow the generator to function as described herein. Additionally, while the embodiments seen in the Figures are generally powered by pressurized water, the scope of the present invention also includes devices and methods powered by fluids other than water.

The water pressure driven generator 1 seen in FIG. 1 will be positioned in pressure vessel 2 in such a way as to form part of the structure dividing high pressure section 20 and low pressure section 21. A circular wall will form the hollow generator housing 4. Housing 4 will interface with walls 26 to complete the separation of high-pressure section 20 and low pressure section 21. Two low-pressure outlets 18a and 18b will be formed in housing 4 and will communicate with low pressure section 21. A high-pressure inlet 16 will be formed in housing 4 at a location where inlet 16 will communicate with high pressure section 20. In the embodiment shown in FIG. 1, inlet 16, outlet 18a and outlet 18b are spaced apart approximately 120° around the circumference of housing 4.

Figure 2:
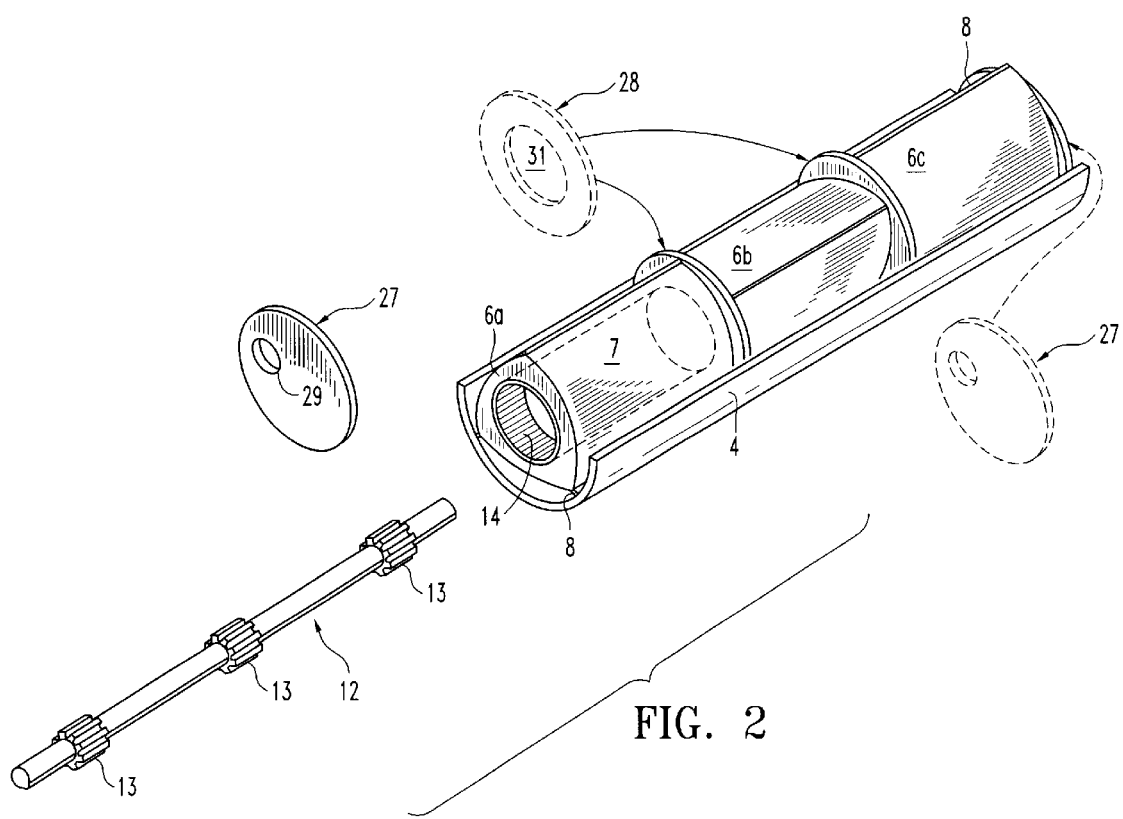
FIG. 2 is a perspective view of the generator housing and rotors.

Positioned within housing 4 will be a rotor 6 with a hollow center cavity 7 formed therein. A power shaft 12 will be positioned within center cavity 7. The manner in which rotor 6 is positioned in housing 4 is better seen in FIG. 2, which illustrates generator 1 removed from pressure vessel 2 and part of housing 4 removed to provide a better view of rotor 6. The rotor 6 seen in FIG. 2 is a trocoidal shaped cylinder which has equilateral triangular outer surfaces. Formed on an internal surface at one end of cavity 7 is the circular track of the internal gear 14. Internal gear 14 is designed to engage spur gear 13 which is formed on power shaft 12. As suggested in FIG. 2, an end section 27 will fit over the front of housing 4 and form a substantially water tight rotating seal (described below) with housing 4. End section 27 will include an offset shaft aperture 29 through which power shaft 12 may extend. While not explicitly shown, it will be understood that any conventional bearing system may be employed to allow power shaft 12 to rotate freely in shaft aperture 29. Shaft aperture 29 is offset in a manner which will position spur gear 13 in mechanical engagement with internal gear 14 when power shaft 12 is positioned within cavity 7. It will be understood the rotation of rotor 6 will cause internal gear 14 to impart torque to spur gear 13 and therefore provide power to shaft 12. FIG. 2 illustrates how a plurality of rotors 6 may be positioned in series. Mid-section dividers 28 having center openings 31 will be positioned between the rotors 6. Center openings 31 will be fixed to and sealed with center cavities 7 of rotors 6. This insures fluid will not be able to flow into center cavities from the exterior of rotors 6. It also insures mid-section dividers 28 will rotate with rotors 6. It also insures that water (or other fluids) will not flow between rotors 6. The continuous path through center cavities 7 and center openings 31 will also allow power shaft 12 to extend through successive rotors 6. While not seen in FIG. 2, it will be understood that each rotor 6 will have an internal gear 14 to mate with the successive spur gears 13 seen on power shaft 12.

Figure 3A:
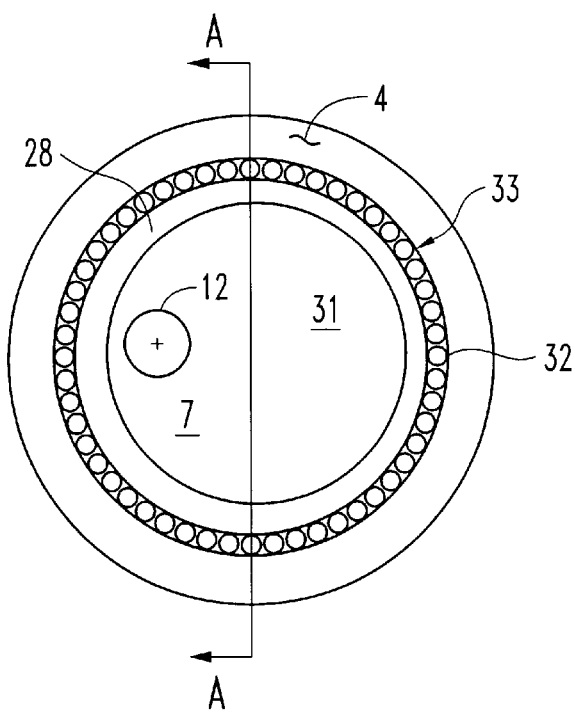
FIGS. 3a and 3b are different views of one rotating seal which may be used in the present invention.
Figure 3B:
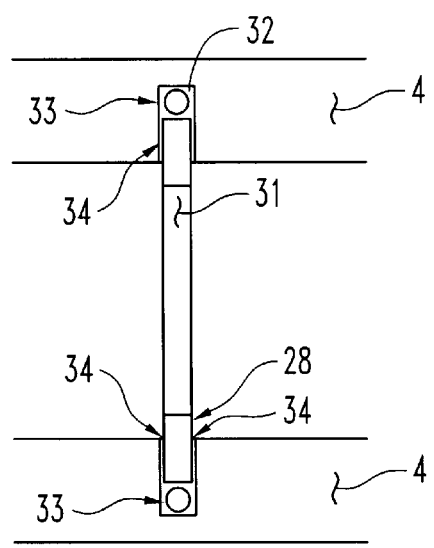

End sections 27 and mid-section dividers 28 will form a rotating seal against housing 4 and will rotate in conjunction with rotors 6. FIGS. 3a and 3b illustrate one embodiment of the rotating seal. FIG. 3a is a front view of a mid-section divider 28 positioned within housing 4. FIG. 3b is a side view taken at section A—A of the same mid-section divider 28. It can be seen that a ball bearing track 32 is formed in housing 4. FIG. 3b shows how the outer edges of mid-section divider 28 will be supported in track 32 by ball bearings 33. To minimize fluid leakage from one side of mid-section divider 28 to the next side, a conventional gasket material 34 will be positioned between the sidewalls of track 32 and the edge of mid-section divider 34. Gasket material 34 will effectively seal against water but will not significantly hinder free rotation of mid-section divider 34 (and thus rotor 6). This gasket mechanism may also utilize a roller to minimize rotational friction during the operation of the mechanism. One such alternative gasket and bearing configuration is shown in FIG. 8 and is discussed in more detail below. While not explicitly shown, end sections 27 will form similar rotating seals with housing 4. It can be understood how end sections 27 and midsections dividers 28, being fixed to rotors 6, form bearing surfaces which allow rotors 6 to rotate in housing 4. Viewing FIG. 2, it will be understood that each rotor 6 is positioned in a separate pressure chamber formed between an end section 27 and a mid-section divider 28 or between two successive mid-section dividers 28.

Figure 4A:
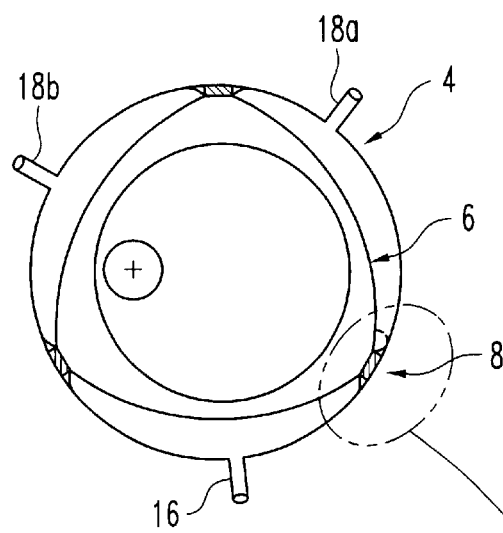
FIGS. 4a and 4b are different views of one rotor seal which may be used in the present invention.
Figure 4B:
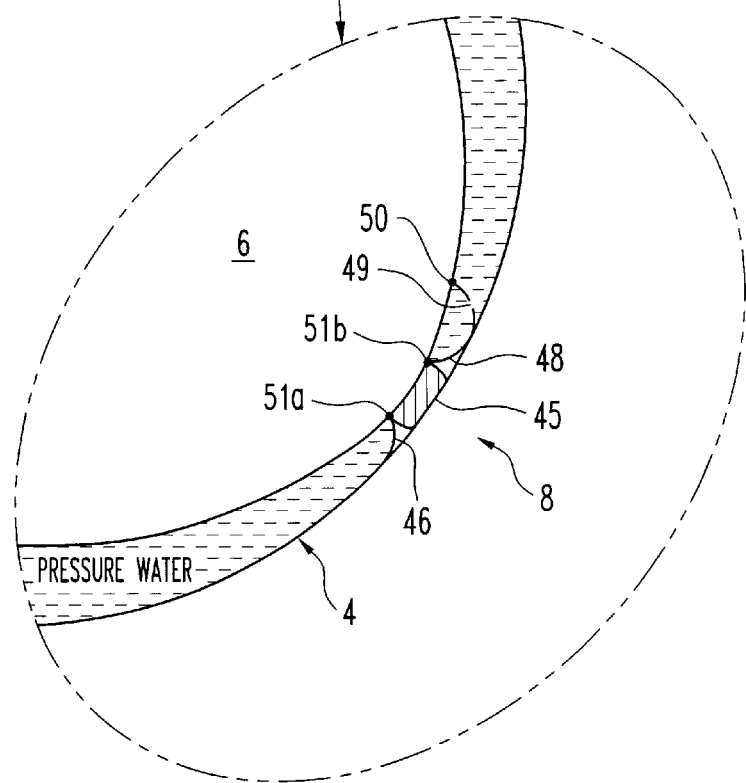

FIGS. 1 and 2 illustrate how a seal 8 will be positioned on the apices of each rotor 6. Seal 8 will engage the inner surface of housing 4 in order to prevent water from freely flowing between the apices of rotors 6 and the inner surface of housing 4. The importance of this will be seen below in reference to FIG. 6. As suggested in FIG. 2, seal 8 will run along the apices of rotor 6 for the entire length of rotor 6. One preferred embodiment of seal 8 is better seen in FIGS. 4a and 4b. An enlarged view of one embodiment of seal 8 can be seen in FIG. 4b. Seal 8 will include a rectangular gasket 45 and two membrane flaps 46 and 48. Rectangular gasket 45 will be a roughly rectangular section (but could be other shapes) of rubber or similar material which is attached at the apices of rotor 6 and sealingly slides along the interior wall of housing 4. Preferably, rectangular gasket 45 is sufficiently wide to momentarily cover inlet 16 and outlets 18 (see FIG. 1) as the rectangular gasket 45 rotates past these inlet and outlet openings. Attached adjacent to rectangular gasket 45 are membrane flaps 46 and 48. It is noted that membrane flaps 46 and 48 are configured to operate with a rotor 6 rotating in the counter-clockwise direction with high pressure water on the left side of seal 8 and low pressure water on the right side of seal 8. These membrane flaps will also be formed of a flexible rubber-like material. One end of membrane flap 46 will be attached to rotor 6 at attachment point 51a. The other end will drape down and slide along the interior of wall of housing 4. It can be seen that if the high pressure water tends to leak under rectangular gasket 45, this will tend to force membrane flap 46 to flatten against the interior wall of housing 4, thereby forming a secondary seal (rectangular gasket 45 being the primary seal) which seals with a force proportional to the pressure drop across the seal. Membrane flap 48 is formed somewhat differently than membrane flap 46. Membrane flap 48 is attached at one end to point 51b and at its other end at point 50. This is because rotor 6 will be rotating in the counter-clockwise direction as discussed above. If one end of membrane flap 48 was left loose as is done in regards to membrane flap 46, that end of membrane flap 48 could become entangled with rectangular gasket 45 as it rotates toward that flap. Additionally, membrane flap 48 will have a series of apertures 49 formed in the flap to insure water pressure above the flap tends to force the flap to seal against housing 4.

FIG. 2 also illustrates how adjacent rotors 6 will have an angular offset. It can be seen that rotor 6b is offset from rotors 6a and 6c. As is explained in more detail below, the offset nature of power shaft 12 results in rotor 6a providing different amounts of torque at different stages in its rotation. By positioning rotor 6b at an angular offset, rotor 6b will be able to provide higher torque to power shaft 12 when rotor 6a is in its low torque position. Naturally, the reverse it also true in that when 6b is in a low torque position, rotors 6a will be in a position to provide higher torque. In the embodiment shown, the angular offset between rotor 6a and rotor 6b is approximately 60°. However, those skilled in the art may select varying offset angles.

Figure 5:
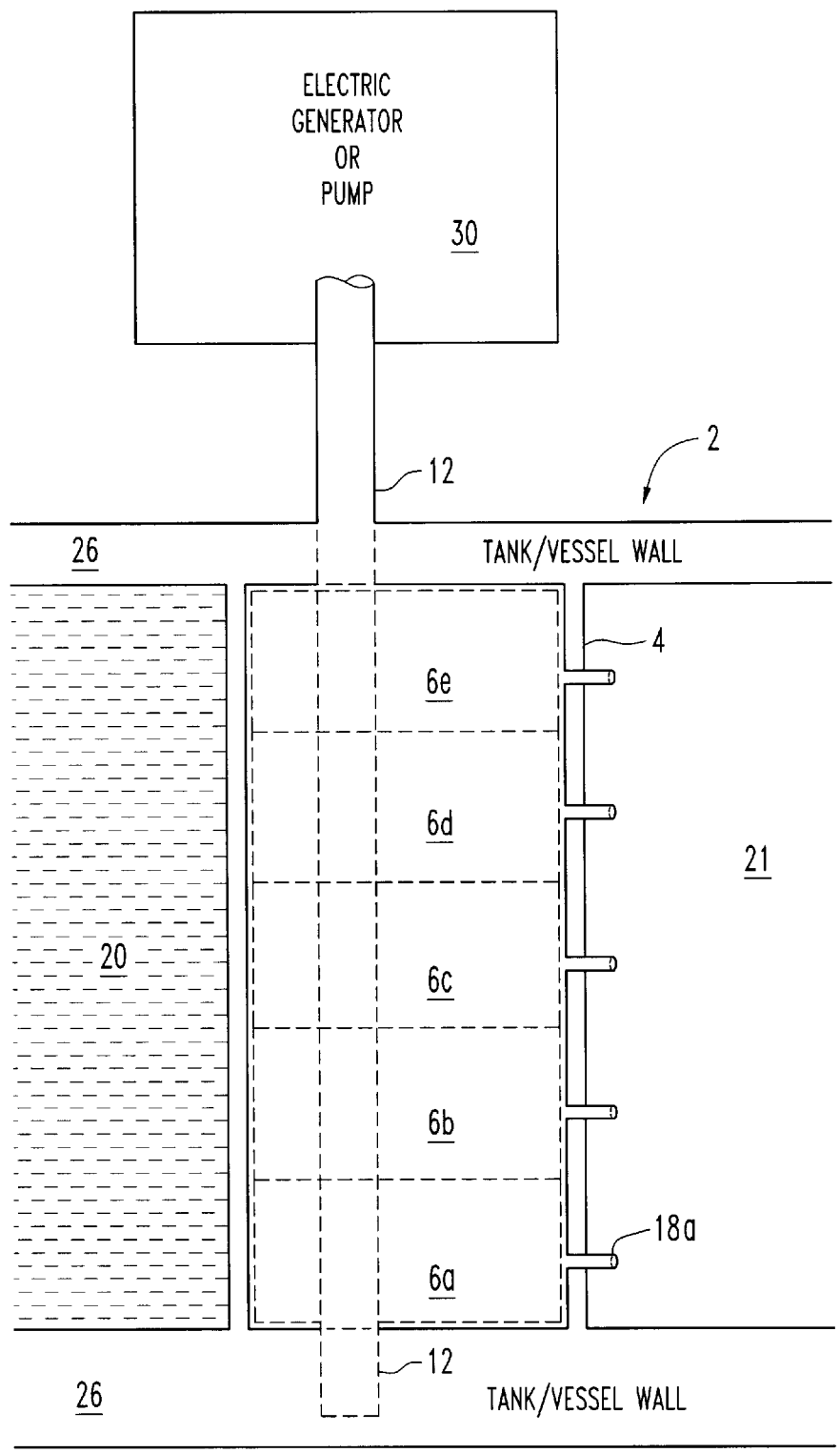
FIG. 5 is a top view showing a series of rotors in a generator housing.

FIG. 5 is a view of water pressure generator 1 taken along the section line AA seen in FIG. 1. FIG. 5 shows a series of five rotors 6a–6e. High pressure section 20 will supply high-pressure water through inlets 16 (hidden from view in FIG. 5), to rotate rotors 6a–6e prior to the high pressure being released through outlets 18 as described below. FIG. 5 illustrates how the length and number of rotors 6 may vary from embodiments such as seen in FIG. 2. It is envisioned that the embodiment in FIG. 5 will have power shaft 12 extend beyond walls 26 of pressure vessel 2 to a piece of equipment 30 such as a generator or pump or provide the mechanical drive for a hybrid mobile vehicle. It can be seen how the power stored in the high-pressure water may be recovered when used to rotate power shaft 12 and drive equipment 30.

Figure 6A:
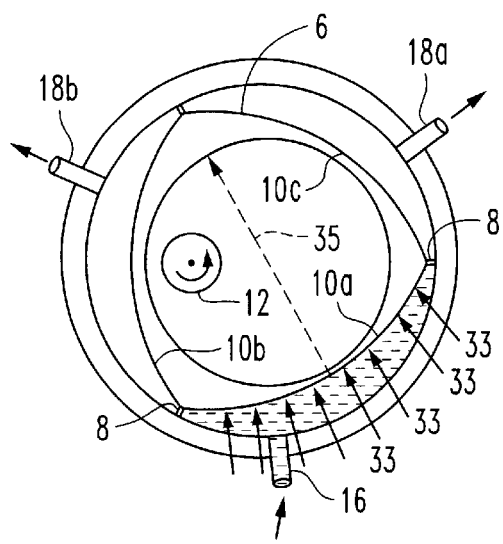
FIGS. 6a–6d illustrate the rotor in several different positions as the rotor turns in the generator housing.
Figure 6B:
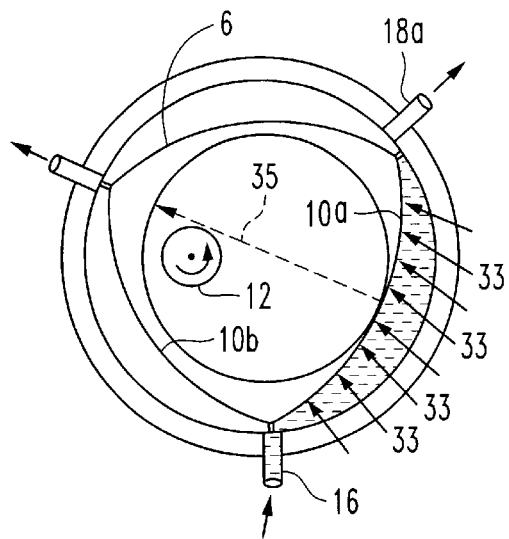
Figure 6C:
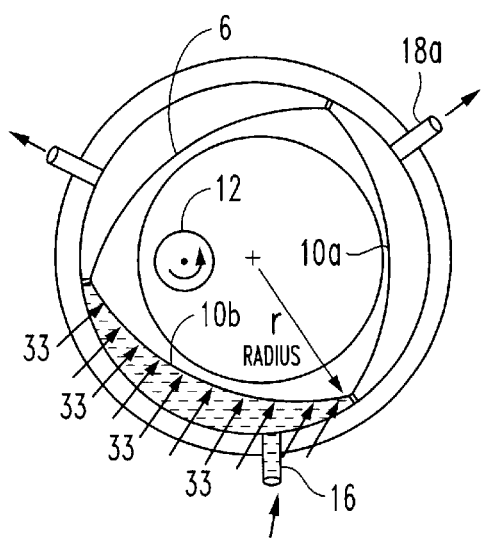
Figure 6D:
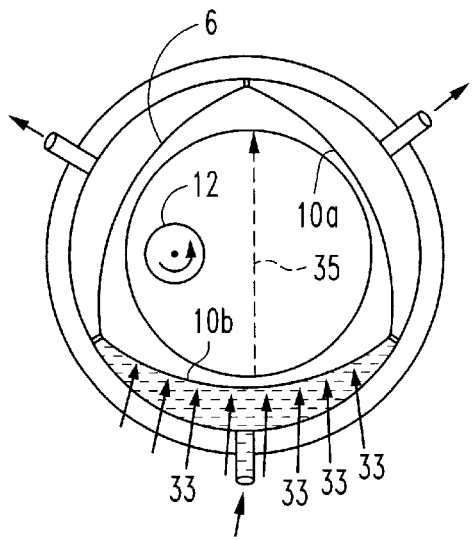

The operating principle of generator 1 is best understood with reference to FIGS. 6a–6b. In FIG. 6a, high pressurize water enters inlet 16 and acts against side 10a of rotor 6 as suggested by force arrows 33. Seals 8 act to prevent the highly pressurized water from reaching outlets 18a or 18b. Therefore, water acting on surfaces 10b and 10c of rotor 6 is at the lower pressure of section 21 with which outlets 18a and 18b communicate (as seen in FIG. 1). The higher-pressure acting on rotor surface 10a will have a resultant force 35, represented by a broken arrow line. It can be seen that the resultant force 35 will create a moment arm around power shaft 12, thereby transferring torque to power shaft 12. In this manner, the pressure acting on surface 10a of rotor 6 will continue to impart torque to power shaft 12 as long as surface 10a is exposed to high pressure water. FIG. 6b shows the seals 8 just before passing inlet 16 and outlets 18. At this point, high-pressure water is still acting upon surface 10a. However, as soon as the seals 8 pass the respective inlet 16 and outlets 18, the water acting against surface 10a will equalize to the lower pressure in section 21 (see FIG. 1) and higher pressure water from inlet 16 will begin action against surface 10b as seen in FIG. 6c. This rotation is shown continuing in FIG. 6d.

As mentioned above, there are certain positions of rotor 6 which apply more torque to power shaft 12 than other positions. This can be seen in comparing FIG. 6b with FIG. 6d. In FIG. 6b, the resultant force 35 passes very close to the center of power shaft 12. Therefore, there is a shorter moment arm and less torque is generated. On the other hand, when rotor 6 is in the position shown in FIG. 6d, there is a larger moment arm transferring a corresponding larger torque to power shaft 12. It is for this reason that the series of rotors 6 seen in FIG. 2 have angular offsets. If the rotor 6b in FIG. 2 is in a position equivalent to FIG. 6b, there will be little torque transferred to power shaft 12 by rotor 6b. However, rotor 6a will at this point be in a position similar to FIG. 6d and therefore be transferring much greater torque to power shaft 12. By establishing the series of rotors 6 at different angular offsets, it is assured that at least one rotor 6 will always be transferring torque to power shaft 12.

Figure 7:
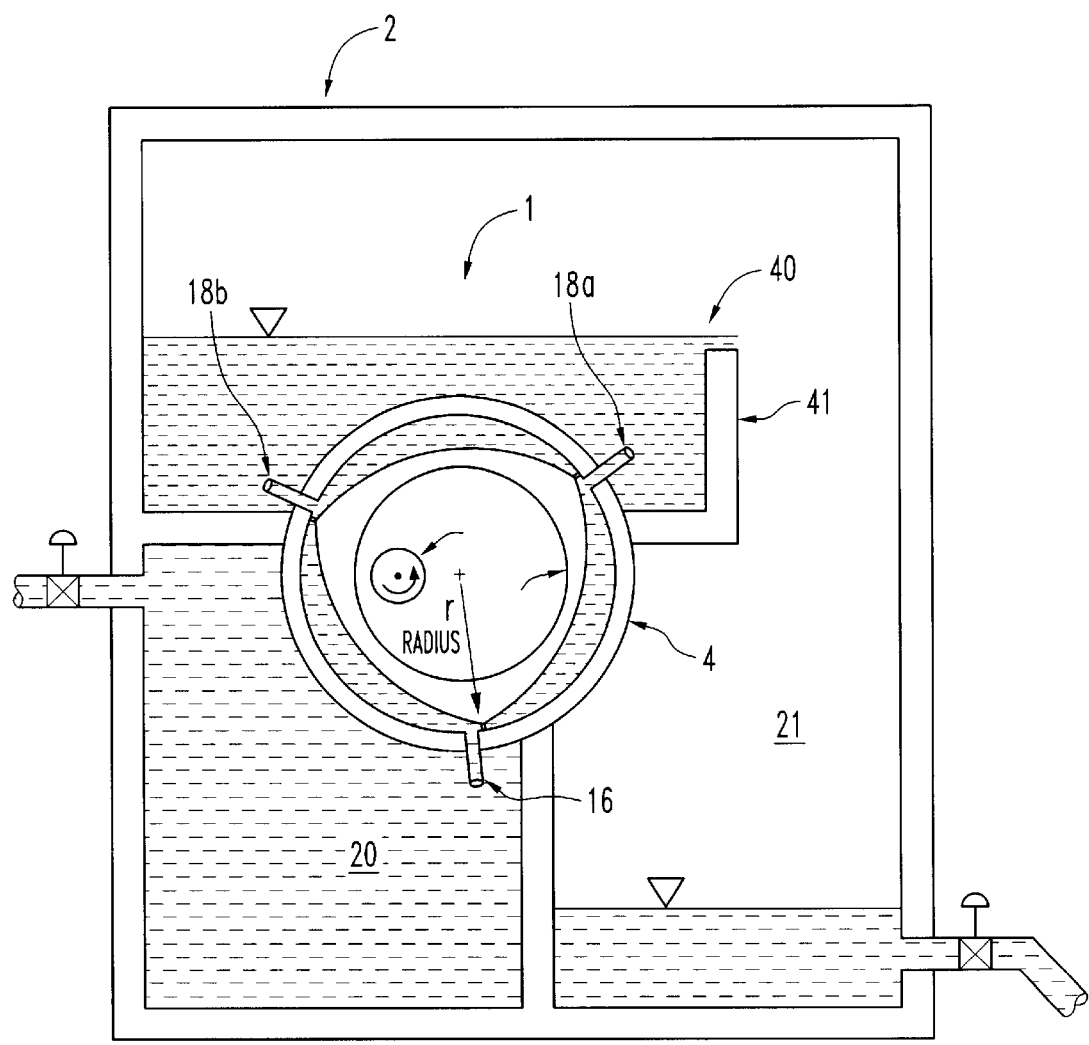
FIG. 7 is an alternative method of employing the fluid pressure driven generator.

A slight modification to the pressure vessel 2 enclosing water pressure driven generator 1 is seen in FIG. 7. Pressure vessel 2 includes an equalization basin 40 formed by sidewall 41 extending upwards above the height of outlets 18. Because some leakage at seals 8 is probable, at least some water will normally flow from outlets 18. In the embodiment of FIG. 1, water-exiting outlet 18a is deposited at the bottom of section 21. However, because the outlet 18b in FIG. 1 is open to the pressurized air in section 21, it may come to pass that as a seal 8 traverses outlet 18b, some air will be forced below outlet 18b. This is generally not considered favorable to optimal operation of generator 1. The basin 40 in FIG. 7 eliminates this concern by insuring outlet 18b is always submerged in water and thus, cannot draw any air into the generator housing 4.

It will be recognized that the generator/motor of the present invention, because it is powered by a substantially incompressible fluid, operates without any significant mass flow through the system. Since water is substantially incompressible, theoretically no volume of water must enter the housing through the higher pressure inlet in order pressurize the water therein. Likewise, higher pressure water coming into communication with the lower pressure outlet does not expand and exit though the outlet. As a practical matter, the only water flow through the generator is due to whatever small amount of leakage occurs around the seals.

A still further alternative embodiment is seen in FIGS. 8a, 8b, and 8c. FIG. 8b illustrates the generator/motor 60 which generally comprises a housing 64, a rotor 62, a drive or power shaft 65, high pressure inlet 72 and low pressure outlets 74a and 74b. Generator 60 is similar to previous embodiments in that seals 68 are positioned on the exterior wall 67 of rotor 62 and shaft 65 will have spur gear 66 engaging internal gear 63 on rotor 62. However, generator 60 differs from previous embodiments in that rotor 62 is substantially circular in cross-section and in that rotor 62 utilizes a different bearing mechanism.

The bearing mechanism will comprise bearing assembly 75 as best seen in FIG. 8c. Bearing assembly 75 will generally include the bearing housing 76 formed within generator/motor housing 64 and a bearing arm 77 which extends from rotor 62 into bearing housing 76. In the preferred embodiment shown in the figures, bearing arm 77 will be T-shaped and will include two rotor bearing surfaces 78. Also positioned within bearing housing 76 are roller shafts 80 having roller bearings 79 positioned thereon. It will be understood that roller bearings 79 will support bearing surfaces 78 and provide for low friction rotation of rotor 62 within generator housing 64. At the juncture where the bearing arm 77 enters the bearing housing 76, a seal 82 will be positioned to minimize the fluid in fluid space 70 (between rotor 62 and housing 64) from leaking into bearing housing 76. The seals 82 do not provide any significant structural support and function mainly for the purpose of fluid sealing. Generally, the rotor is only supported at two points—the spur gear and the bearing contact as suggested in FIG. 8c.

It should be noted that in the embodiments shown there is only a single set of roller bearings 79 (see position of single roller bearing 79 shown in FIG. 8c). While alternate embodiments could of course have multiple sets of roller bearings 79, a single set of roller bearings provides the least area of mechanical interaction and therefore the minimal frictional losses. This single bearing configuration makes it easier to conceptualize the rotational force which will be generated by the fluid pressure since this configuration constrains the rotor from linear displacement but does not constrain the rotor from rotation.

Although certain preferred embodiments have been described above, it will be appreciated by those skilled in the art to which the present invention pertains that modifications, changes, adaptations, and improvements may be made without departing from the spirit of the invention defined by the claims. For example, where the specification recites a "generator", it will be understood that the invention could function not only as a generator of electricity, but also as a generator of mechanical power, i.e. function as a motor, and the terms generator and motor generally should be considered interchangeable. As a further example, while rotor 6 has been shown having a trocoidal shape, many other shapes of rotors are possible such as round rotors, elliptical rotors, or other rotor configurations. Additionally, the source of pressurized water for generator 1 does not need to be a commercial or residential water line. Nor is it necessary that the fluid inlets and outlets are associated with some type of pressure chamber as seen in FIG. 1. Rather, the fluid inlets and outlets could be connected directly to lines such as piping or hoses carrying the fluid. It is envisioned that a high-pressure pump could be attached to the generator's water inlet and that significant power and speed could be obtained from generator 1. In some applications, generator 1 could replace a conventional internal combustion engine. One such application would be in hybrid mobile vehicles where the hybrid vehicle utilizes an alternative power source for water (or another fluid) pressure and for water recirculation. In such a hybrid mobile vehicle, water pressures in the range of 100 psi to 500 psi to 5000 psi (or higher) could be employed. Also, the invention is readily adaptable for use in generating power at any decentralized site where pressurized water (or another fluid) is made available. All such modifications, adaptations, changes, and improvements are intended to come within the scope of the present invention.

I claim:

1. A fluid pressure driven generator comprising:
   a. a generator housing;
   b. a rotor positioned within said housing and having an internal offset gear;
   c. a power shaft having a spur gear engaging said internal offset gear;
   d. a high pressure inlet formed in said housing;
   e. a low-pressure outlet formed in said housing; and
   f. a single bearing assembly supporting low friction rotation of said rotor within said generator housing.

2. The fluid pressure driven generator according to claim 1, wherein said generator housing includes a bearing housing and a bearing arm connected to said rotor extends into said bearing housing and forms a bearing surface.

3. The fluid pressure driven generator according to claim 2, wherein said bearing arm is T-shaped with said bearing surface positioned thereon and said housing is shaped to accommodate said bearing arm.

4. The fluid pressure driven generator according to claim 3, wherein said bearing housing includes two roller surfaces engaging two bearing surfaces on said bearing arm.

5. The fluid pressure driven generator according to claim 2, wherein a seal is positioned between said bearing housing and said bearing arm.

6. The fluid pressure driven generator according to claim 2, wherein said rotor has substantially hollow center cavity and said power shaft extends through said cavity.

7. The fluid pressure driven generator according to claim 1, wherein said generator housing is substantially circular.

8. The fluid pressure driven generator according to claim 1, wherein a plurality of rotors are placed in series.

9. The fluid pressure driven generator according to claim 8, wherein said each of said plurality of rotors has an angular offset from its adjacent rotor.

10. The fluid pressure driven generator according to claim 1, wherein said high-pressure inlet and said low pressure outlet are connected to high pressure and low pressure lines respectively.

11. The fluid pressure driven generator according to claim 10, wherein fluid within said generator is at a pressure of approximately between 50 psi and 5,000 psi or more.

12. The fluid pressure driven generator according to claim 1, further including two low pressure outlets.

13. The fluid pressure driven generator according to claim 1, wherein a plurality of seals are positioned between said rotor and an interior surface of said housing.

14. The fluid pressure driven generator according to claim 1, wherein the pressurized fluid driving the generator is a liquid.

15. The fluid pressure driven generator according to claim 14, wherein the pressurized liquid driving the generator is water.

16. The fluid pressure driven generator according to claim 14, wherein the pressurized liquid driving the generator is oil.

17. A fluid pressure driven generator comprising:
   a. a generator housing;
   b. a rotor positioned within said housing and having an internal offset gear;
   c. a power shaft having a spur gear engaging said internal offset gear;
   d. a high pressure inlet formed in said housing;
   e. a low-pressure outlet formed in said housing; and
   f. a source of substantially incompressible fluid being in communication with said high pressure inlet.

18. The fluid pressure driven generator according to claim 17, wherein a plurality of seals are positioned between said rotor and an interior surface of said housing.

19. The fluid pressure driven generator according to claim 18, further comprising a single bearing assembly supporting low friction rotation of said rotor within said generator housing.

20. The fluid pressure driven generator according to claim 18, wherein said rotor has a trocoidal shape or a substantially circular shape.

21. The fluid pressure driven generator according to claim 18, wherein said rotor has substantially hollow center cavity and said power shaft extends through said cavity.

22. The fluid pressure driven generator according to claim 18, wherein said high-pressure inlet and said low pressure outlet are connected to high pressure and low pressure lines respectively.

23. The fluid pressure driven generator according to claim 18, wherein fluid within said generator is at a pressure of approximately between 50 psi to 5,000 psi or more.

24. The fluid driven generator according to claim 18, wherein said generator operates with no significant fluid mass flow.

25. A fluid pressure driven generator comprising:
   a. a generator housing;
   b. a rotor supported within said housing by a low friction bearing system;
   c. a power shaft positioned within said rotor by a support structure which generates torque at said shaft when pressure is exerted on said rotor;
   d. a high pressure inlet formed in said housing;
   e. a low-pressure outlet formed in said housing; and
   f. a pressurized water source in communication with said high pressure inlet.

* * * * *